United States Patent
Teacherson (10) Patent No.: US 6,578,010 B1
(45) Date of Patent: Jun. 10, 2003

(54) MULTI-NODE NETWORK MARKETING COMPUTER SYSTEM

(76) Inventor: George A. Teacherson, c/o Box 762, Palm Beach, FL (US) 33480

( * ) Notice: Subject to any disclaimer, the term of this patent is extended or adjusted under 35 U.S.C. 154(b) by 0 days.

(21) Appl. No.: 08/461,150

(22) Filed: Jun. 5, 1995

(51) Int. Cl.[7] .............................................. G06F 17/60
(52) U.S. Cl. ................... 705/14; 705/1; 705/8
(58) Field of Search ............... 705/26, 1, 14, 705/8

(56) References Cited

U.S. PATENT DOCUMENTS 5,537,314 A * 7/1996 Kanter ........................ 705/14

OTHER PUBLICATIONS

Fraser, Ian. See it before you believe it. EuroBusiness. Mar. 1995, vol. 2, No. 10, pp. 70–74. DIALOG: Gale Group Trade & Industry.*

Free, Valerie. Magic Marketing: Is network selling about to revolutionize the way we live and work? Success. Mar. 1992, vol. 39, No. 2, pp. 21–33. DIALOG: ABI/Inform.*

Roller, Dave. How to Make Big Money in Multi–Level Marketing. Prentice–Hall, Inc. 1989. Chapters 4, 8, 9.*

Dictionary of Finance and Investment Terms—Conglomerate.*

Failla, D. "How to Build a Large Successful Multi–Level–Marketing Organization", Multi–Level Marketing International, Inc. 1984, pp. 4–15.*

"Who Says You Can't Buy Time"—product flyer.*

* cited by examiner

Primary Examiner—Kyle J. Choi
(74) Attorney, Agent, or Firm—George A. Teacherson (57) ABSTRACT

Method, process and means for accomplishing multiple, independent funds raising by multiple, independent entities, each of the entities under their own names, all under one "umbrella" system, having a limited-population subset system, all with the added and crucial benefit of a novel process, and system therefor, for safekeeping entity funding flow while safekeeping and preventing loss of funds by individuals.

25 Claims, 2 Drawing Sheets

MULTI-NODE NETWORK MARKETING COMPUTER SYSTEM

FIELD OF THE INVENTION

The instant invention relates to the art of providing specific operating means for multi-level, network or referral marketing operation processes and more specifically to means for handling, under human control, many independent groups under the banner of an overall operating system while retaining each group's own individual identity.

BACKGROUND OF THE INVENTION

Network or referral marketing, classically, involves a central, starting office/business/warehouse, core business, from which the marketing program and product to be sold originates and flows. In the classic pyramidal shape, the main office/originators are at the top of a business chart that spreads out to show more and more sales type people the farther down the chart one proceeds. Further, all the sales people classically hold two "jobs" that of marketer of the firm's product(s) and that of supervisor of those other marketers which each individual himself, individually brought into the program.

It is seen that the classical network marketing firm is a highly centralized business structure which proceeds from the originators out as far and as wide and as "deep" in levels as it can go. Some of the very largest operating firms on the planet are using the marketing method: Amway, Shaklee, and even Avon are just a few examples. It is an accepted and legal type of firm.

In Japan, "jinmayku" or one's own "network of contacts" is everything in life. In America, networking can give hope to those who otherwise have no hope except handouts. It can change lives for the better.

In Washington, D.C., the lobbyist uses his contacts on a regular basis. And his earnings depend upon and increase with the importance of his contacts. It is an accepted political means of earning a living. The corporate "old boy network" is still an extremely important part of getting ahead in the corporate world.

The use of one's contacts to better oneself, worldwide, in all walks of life is an accepted, important and necessary part of living on this planet.

Even "Success" magazine devotes a monthly section to the technique. It's also taught in Harvard Business school!.

The technique should be available to all because they can help make all of society better when individuals are allowed to better themselves. Such firms (as "Success" states in its May 1993 issue) tap a way of life with a powerful sense of renewal, purpose and fellowship. In other words, society as a whole is better off for the existence of such firms. They allow people to reach for a higher goal when they are so inclined.

However, the classical structure leaves no room for individual initiative within the structure. Yes, the classical structure allows a small fund-raiser to come into its fold and use its products and marketing plan. But this prior art method must be done under the banner of the originating firm's name, not the fund-raiser's name. It would be quite helpful if there was a means by which a small fundraising group could operate its very own network marketing firm under its very own name while still remaining connected to a large, centralized originator for product, help and support. In effect, it would act as a "division" or a "franchise" of the larger or, in the instant case, central originator, yet, still totally independent and able to use its own name in business. Of course, it would preferably be a wholly independent firm operating under contract to the originator. An independent contractor is the instant preferred form of association with each group exercising its own private control over its own personalized program made after the manner of the instant invention.

SUMMARY OF THE INVENTION

Most network marketing firms use mainframe computers to maintain their records of product sales and "levels" of member/marketers. The instant invention controls use of such computers, and computer-related devices such as hard disks, floppies, modems, etc. to individually customize each fundraising group the instant system for their own preferred use and adapt a general purpose computer into a special purpose machine. Many groups may find P.C.'s, mini's, laptops, notebook computers, etc. the way to go. A few may even be large enough to rent or dedicate a portion of their own mainframe computer to deriving the instant novel result:—a computer-implemented method of performing the novel safekeeping and control operations. Howsoever they wish to control the operation of their own individual firms and marketing plans, the computer can also be controlled after the manner of the instant invention to provide the most specialized and individualized control possible by following coded instructions that cause the machine to operate in the instant novel way for each separate group handling each group's separate internal operations.

Howsoever the instant process is handled, and whatever the size of the individual fundraising group (the node), actual transfer of the node's records to the originator are the physical means by which a multi-node network or referral marketing firm can operate with each node operating under its own individual name but also simultaneously operating under the overall published rules of the originator.

This transfer allows the originator to check the independent "books" of each node and assure himself of his due royalties. The transfer may be made by physically shifting from node location to central location either computer storage devices, such as disks and tapes or, physical ledger books. Another method of records transfer is by the physical use of modems on a computer to computer basis with the results stored on computer-compatible media at the receiving end.

Naturally, updating the records will always be required. This process may proceed via the mails, facsimile machine or by modem where the duplicate, centrally stored disk is rewritten at the direction of the individual node originating the data link.

If there is a failing to multi-level, network marketing, it lies in that people can invest their hard-earned cash into a firm, plus their precious time and effort and wind up not getting paid, with the company "disappearing" on them. The instant invention addresses this crucially important issue simultaneously.

It is an original object of the instant invention to describe the controlled, internal manipulations of a computer according to its programming flow chart.

It is an object of the instant invention to provide computerized systems means for handling multi-node network marketing.

It is another object of the instant invention to provide computerized system means for safekeeping a network and maintaining its existence.

It is a further object of the instant invention to provide computerized system means for helping small entities fund raise under their own names.

It is still another object of the instant invention to provide computerized system means for providing payment/compensation for an originator and/or a central, main node.

It is a still further object of the instant invention to provide combined safekeeping means and multi-node means as an important single species.

It is still another object of the instant invention to provide system means for handling safekeeping and multi-node separately in entirely different firms and totally separate situations if required but never detracting from the major importance of the combined invention species.

BRIEF DESCRIPTION OF THE DRAWING

The figures of the drawing, in which like designations denote like elements, shows a computer flow chart characterizing how a computer 12 would handle the tracking of the pyramidal nature of typical multi-level positions associated in the instant novel process as well as a computer flow chart within bracketing for delineating humanly controlled operation of the instant novel process in an analogous situation defining the handling of a more standard business operation; all feeding information to and accepting information from the computer 12 shown in the data stream 60 with data storage media 9 standing by for transferring invention information among users. Designated

DESCRIPTION OF THE PREFERRED EMBODIMENT

The entire drawing as a computer flow chart shows how and directs how all the interconnected discrete nodes N are manipulated by the calculating input and output data flow 60 of a computer 12 which internally manipulates the external devices and/or input so to produce the desired output result.

It is the Inventor's intention to describe the internal manipulations of a computer according to its programming flow chart. This is how the instant invention is providing specific operating means structure for producing the instant novel result. The actual flow chart directs how the computer handles or specifically controls the method and makes possible the handling of multiple, independent nodes under one umbrella or standardized set of rules.

A distinguishing feature of the instant invention is lack of core business and non-related or independent nodes N.

There are many small groups extant. Some of these groups do legal work, some do charity work, all seek to help the world in their own way. Yet, their help is quite limited by how much capital they can generate. Further, some with high ideals may be so small that they do not have a "name" that can attract large-scale philanthropy in any situation.

As it presently stands, for-profit groups may sell a product or service to generate capital. Not-for-profit groups must generally rely solely on largesse for their working capital.

No matter how one seeks to generate capital, it becomes limited, especially so in a recession situation, by how much funds individuals are willing to give out and themselves never see again. It would be extremely helpful to all concerned if a way could be found to re-generate the capital that individuals give away so that the resources may be counted upon to be re-donated again on a steady, unceasing basis.

Classical multi-level/network/referral lobbying-type marketing provides means to replenish an individual's capital and thus provide a steady, unceasing flow of assets to a group (or node).

Unfortunately, many worthy groups do not want to appear to "endorse" a centralizing, originating organization - especially if the originator A is for-profit while the group itself, or node B, is not-for-profit.

Hence, means to allow individual groups B to operate under the auspices of a central organizer A, yet, remain totally independent and even continue to use their own names would benefit all. The instant invention accomplishes this end through a series of steps. A novel process results that takes the "gamble" out of network marketing. And a system is disclosed for handling the process.

The instant invention provides novel means directing the processing of network marketing business data and thereby makes possible fundraising for individual, separate groups under their own names; yet remaining under the auspices of a single originator A. Each node B is an independent fundraising group. It may be either for-profit or not-for-profit. Although it could be, it will generally NOT be related to any other node B.

The originator A is at a central location. It is the umbrella and the auspices under which all the nodes B proceed. The originator A may keep records for each node B individually. These records would, in the preferred embodiment, be on computer compatible storage media 9. The originator A may provide product(s) for the nodes B, each to move through its own organization. And these products may be "house branded" with each node B's own individual name. This thereby allows each node B to do its own business without itself becoming individually involved with products, manufacturing, warehousing or anything else not related to its primary purpose.

Figure 1:
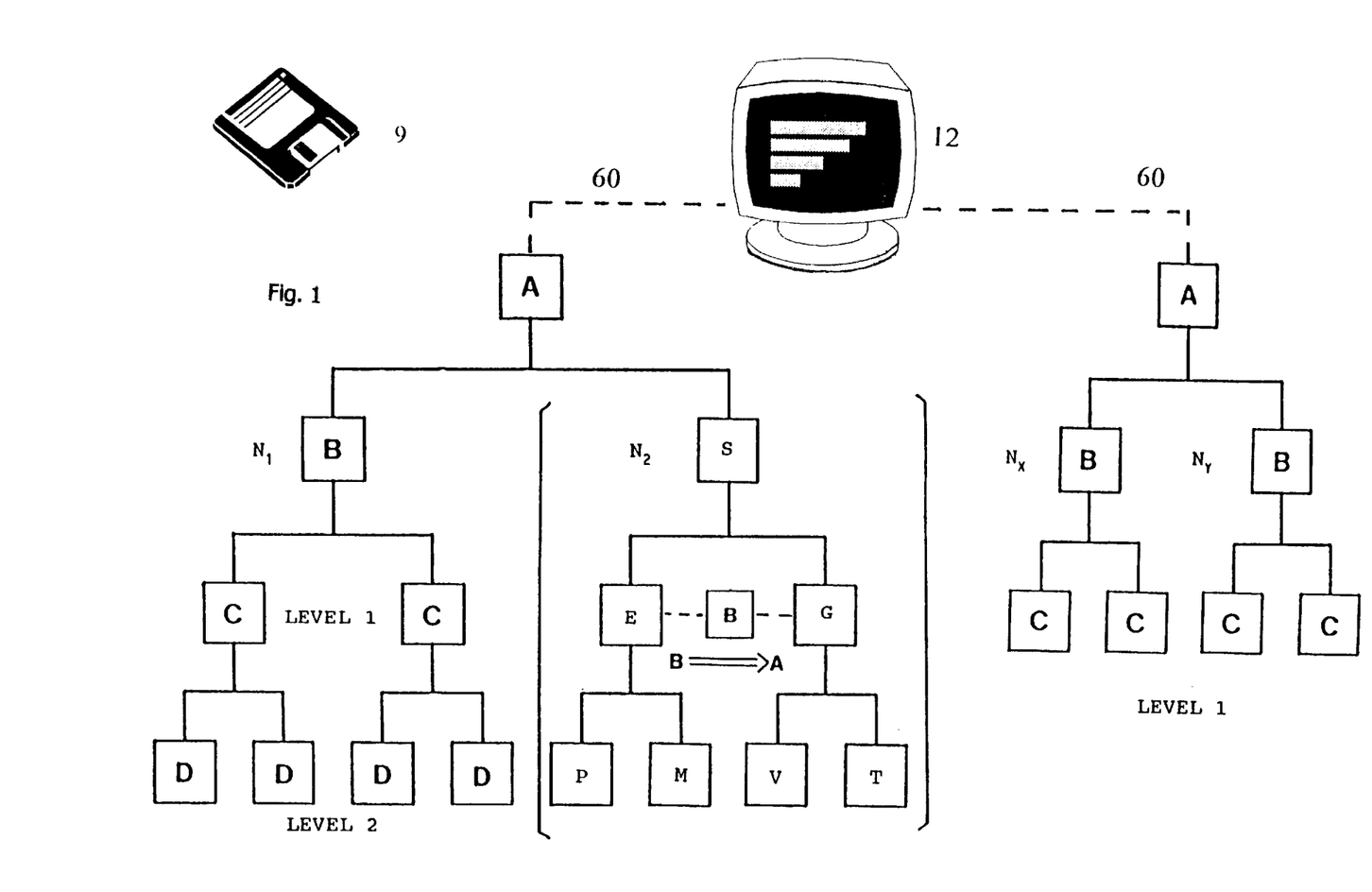

Each node B individually and by itself operates in the classical multi-level manner. The drawings shows the levels for entities $N_1$, $N_X$, $N_Y$ is a 2×2 process where each member finds two other members and so on down the levels. Each node B is preferably independent of and not related to all other nodes B. Their levels proceed down through Level 1, C, and Level 2, D. This particular aspect of the instant process is no different than the standard operating process of multi-level prior art.

In the instant case, however, there is the overseeing originator A. This originating entity A is responsible for the seed idea, the overall rules of operation, for providing any products or services, offered, fringe benefits, etc. and, quite importantly, to make sure that each node B remains true to the original concept. The rules are preferably programmed into the memory of a computer 12 and/or stored on separate memory storage means 9 such as magnetic disks, optical storage devices, CD-ROM, etc. These storage devices 9 carrying the rules intact are then used to disseminate the operating instructions for the system. This process is represented by the dotted line showing the originator A appearing in proximity to each separate node B, this being accomplished via computer data stream 60 (dotted lien) which allows information for command and control of each to be accomplished; and the solid line from the originator A directly to each node B. For this service, the originator A gets paid by each node B separately. Payment can take place in at least two ways. First, directly under contract to the originator A. Second, by placing the originator A's name in one of the starting positions of the node B's business organization so that the originator A gets paid as upline (referring member) to the node B's own downline (referred-by, newer, later joining member-marketers).

Each node B will independently initiate sales of its own organization—$N_1$, $N_X$, $N_Y$, etc. The means for this may be via computer network "bulletin board", physical flyers distribution, oral referral, or any other means contemplatable. Each node B will keep its own records as described above. Each node B should make duplicates of its records as well. The means for making duplicates can be via computer 12 rewriting same to a separate disk 9 (or simply photocopying actual ledger books). The original and duplicated records should never be stored in the same place—this merely being simple common sense business.

The originator A will indoctrinate the rules of operation and provide for at least one physical area for records storage space for the duplicated records if such service is so wanted by any of the nodes B; and provide guidance, products, and services sourcing; fringe benefits sourcing if necessary, and house branding if necessary. It, however, does NOT necessarily operate under its own name. Instead, the originator A may very well operate under the names of each individual node B in each individual node B's own organization. This allows each node B to maintain its own identity. "A" may also keep duplicate records from each node B so to provide a backup if the node B's own records somehow get lost or destroyed. Plus, there must be means for updating those duplicate records to keep them current. These means could be disseminated via compute and modem, or simple physical delivery, such as of media 9, by mail or messenger. And the duplicate records themselves may be duplicated and stored by the originator A in the central location and in more than one location for further backup.

It is important to maintain each node B's individually so that no node B is thought to "endorse" another entity of any kind. Each node B may use or even add its own rules to its own operation. Yet, all nodes B operate under the auspices of the single originating entity A and deal with the central location and follow its overall rules of operation.

Between the brackets on the FIG. 1 of the Drawing is shown an analogous flow chart of the instant invention handling and controlling fundraising for a special project $N_2$. Inventor originated a Solar Sail Race S. Funding was required to do Engineering E and Guidance G (among many other aspects not shown for simplicity). Fundraising for the overall project $N_2$ (S), a project not related to $N_1$, or any $N_X$ or $N_Y$, was planned (but never disclosed or actualized in any manner) by the Originator A via the completely independent processes of making and distributing a movie M and its attendant ancillaries. A special airplane P was designed for sale in kit form. Profits from a TV program T on space science, ultimately culminating in daily Space Sail Race S updates would also add to the fundraising capacity of S. During the Race S, volunteers V of amateur radio operator enthusiasts (Hams) and amateur astronomers, would both work together to optically calculate the position in space of each Sail competing in the Race S and update the Sail's computers for changing course via radio. This would be a non-profit aspect of the instant invention.

As can be seen from the above, the Race S plan was to operate according to the instant invention with each aspect, E and G shown, acting de facto as separate nodes B, fundraising in turn, by acting de facto as originator A to entities P, M, V and T. Records transfers were paramount for the survival of the originating entity S, here acting as A. All entities P, M, V and T are not related to each other. They have separate functions, goals, factories, etc. The multiple groups are independent. The airplane P's overall goal is to sell airplanes at a profit. It has nothing to do with any other entity shown or not shown. One of the planes P would be flow in the movie M, but many airplanes would also be flown in the movie M. The movie M (and its ancillaries) is a completely separate entity and not related to any other. The TV program T was a separate entity preparing as its goal to publicize Race S. And non-profit entity of volunteers V clearly had no business dealings with any other entity. V's goal was to operate the Race S, not fiance or originate it. Although Inventor A Originated Race S, he had no business extant whatsoever (no core business). So Race S and each entity, E,G,P,M,V,T were neither related to each other, nor to Inventor A. Inventor A had dealings with each entity as originator to the extent of his capabilities and desire to have a "hand in", but he had "set up" each non-related entity to independently finance or fund the unrelated Race S to the best of its own ability regardless of the operations of any of the other entities B. Thus, S's overall goal had noting to do with the independent overall goal of each of the independent entities P,M,V,T. (The overall idea was to have S act in the capacity of A. That way, inventor stayed out of any need for having a business and its attendant personal complications. Passive royalties would have been sufficient.)

The plane P was versatile and could also be sold to Volunteers V and used as transportation for the TV T crews. Then again any plane could do the same. So P's integrity as an independent group was inviolate.

So it is seen that Originator A had no core business himself, each independent node B, N (multiple entities) had no relation to any of the others or their independent goals, or to the financed project whose overall goal was just to put a Race S in the sky. Yet, an overall systems approach was contemplated after the manner of the instant invention to be used to fundraise for the project S. A computer-directed operation was necessary to maintain human control over the whole. Parts of the profits generated from the entities were to be used to fund the Race S. Hence, the Race S was the umbrella under which all other nodes operated. The nodes operated independently, yet at the same time worked together, via the instant invention, to fund the overall project S.

Figure 2:
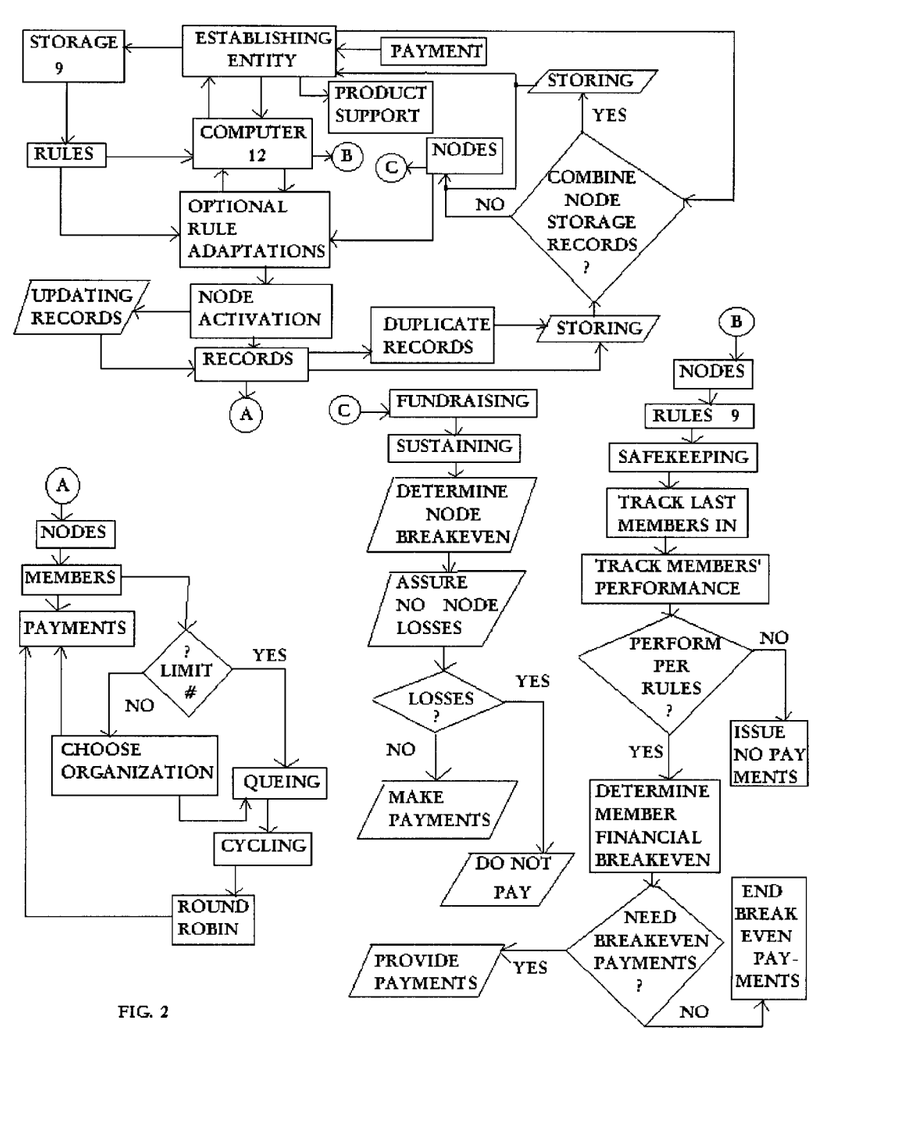
FIG. 2 shows a system flow chart denoting the systems operations required for a computer 12 to operate the invention starting with the data stored on media 9.

A subset of 'multi-node' is "multiple, limited-member groups". This is also another way a small, limited-resource fund raiser can generate working capital. Now by using this aspect, the working capital can actually be generated in-house! Hence, you've unexpectedly got a group, whether a charity, a collection of starving artists or what-have-you, suddenly able to generate working capital in true by-one's-own bootstraps fashion. See FIG. 2, branch completion A.

Classical multi-level marketing typically expects to recruit many thousands upon thousands of members into the network before any significant amount of money or commissions can be made by the upline members. Contrarily, the instant "multiple, limited-member groups" use the computer 12 internal processor to limit each group to a small number of members only. This situation is completely opposite to the never-ending networks of the prior art. The instant members would preferably be personally known to each other by virtue of being together on a local area basis (bowling league members, social club members, parent-teacher associations, etc.).

Instead of making significant income only when multiple thousands of marketers finally join one's downline, in the instant multiple, limited-member groups, the computer 12 is programmed to limit the population of each extant group to, say, less than 200 people. Then, the entrance fee owed is preferably set higher than "normal", say $100. As they members cycle (and re-cycle) through the small local group, they buy a place in each of the levels A–D. The commissions on sales then add up and repeated often. Large incomes are then possible to be retained with only a small number of people as each member re-signs-up-again and the instant novel process repeats. The computer 12 processor tracks the sales commissions, automatically deducts re-sign-up fees from commissions due any given member. And each member cycles one's own position in the group levels A–D until one reaches the "top"- whereupon one's sales commissions would be the largest because each of the members below one in the organization is buying into their new position, and in the instant process, computer 12 is directing commissions be paid on the sales being generated by newly entering members at the bottom. In this subset of the instant invention, each member "climbs" in levels as his or her downline actively purchases the product the organization is set up to sell. When a member finally reaches the Level A position, one receives the largest commission. Here, the commission is based upon the total sales generated by all the people in the organization. Then the member "graduates" by leaving the organization with his or her profit. In the instant invention, computer 12 then re-places the newly graduated member at the bottom of the organization and retains an amount equal to the new-member sign-up fee. Computer 12 then recalculates the commissions due the member's upline in his new level and the process starts all over again. The requirements for recycling a limited number of members is novel. The requirement for a limited number of members is novel. Contrarily, most organizations upon seeing only a limited number of members also see the end of their program!.

As members cycle their positions in the instant novel organization, computer 12 tracks them every step of the way while data stream 60 always keeps computer 12 informed of product purchases as each member purchases each new position. Computer 12 processor then calculates each member's commissions due. It verifies that they have each paid for what they owe for the products required to be purchased at each level A–D (and beyond if desired). It then directs the issuance of commission checks in the proper amount for each of the members.

In the $N_1$ organization shown in FIG. 1, a member would purchase in at a bottom level, here D. The requirement could be to buy one product and sell two of the products to others. As others bought, the organization downline would fill. Classically this process would go on "forever". In the instant embodiment, this process would go on only until a maximum amount of members has entered the organization $N_1$. In fact, the number of members could vary from a minimum number to successfully make the structure work to the maximum number desired. The maximum number can be derived from the perceived ability of a local group to communicate with each other and thus work in concert.

In classical structures, many "mlm" professionals voluntarily sing up underneath themselves as these successful operators of the genus know they can receive even greater commissions as more and more thousands of people sign on underneath their new position. The instant process of limiting the number of total members in any one organization and requiring continuing position cycling of those same members is not seen, suggested or known in the prior art.

With all $N_1$ members buying one of the products and consequently selling two of them, the market for the product is assured, constant and never-ending. Thus, the level A member buys one item and sells one to each member on level B who then each sell to members on level C, who continue the process to level D and so on to the maximum number of members decreed by the organization originator. At that point, computer 12 would issue the largest commission check allowed by the rules based upon the total sales in the total organization. The level A member, having received his check, would now leave the organization and computer 12 would automatically place him in the bottom with a portion of his commission check going toward purchase of an item from a member that originally was his downline and thus now his upline. With the recycling requirement, all members will start at the beginning sign-in and proceed through maximum commissions and then start the process all over again. The market is known. The total profit is known. And all local group members can communicate among themselves so to make the instant process proceed at a mutually agreeable pace.

In the above scenario, there is preferably a time-based element involved. Computer 12 would promote each member to the next higher level only in accord in "seniority" of the member in the group. Storage media 9 would hold each member's original sing-in date and thus, instead of "spreading out sideways" all members of the instant limited member local group would actually be directly above and below one another. Thus, as each member bought product, all members would benefit. And as each member reached the ultimate commission payout - and re-signed up - a round robin of organization sales and member promotions is established with everybody helping everybody else and computer 12 tracking each member's progress, issuing reminders to buy, directing checks to be issued and automatically subtracting "re-up" fees from ultimate checks.

The round robin aspect makes it extremely helpful if all members of any local group know each other personally, live in the same area, and/or communicate with each other regularly.

Note that the instant local group system is no loner multi-level! The limited-member aspect removes that sign-the-whole-word impossibility. It takes the instant process into the world of straight, quota'd direct sales. It is a novel closed-loop system with computer 12 providing feedback to all involved via data stream 60. Furthermore, a small number of people can produce a large amount of commissions. The instant closed loop system ends the go-to-infinity genre and is a novel system and method of operating same. All prior art exhibits the go to infinity recruiting nature.

Understand that one trip through the group levels could be for buying one particular product while the recycled, renewed trip(s) could be for purchases of completely different product(s). Here, the final recycle would then go back to the original product and thence the cycling would start all over again. Computer 12 would direct which products would be bought by whom at what time.

Note that each phase of purchase can be computer 12-directed to be re-signed-up to purchase a greater number count of the same product, finally resulting in starting the cyclical wave of buying all over again with an original count purchase amount.

Cycling through each of a number of purchase phases, or even through just one phase over and over again like continuing waves of buying amongst only a small, limited number of people in an individual group is novel in the world of direct sales.

Computer 12, operating by following rules stored on media 9 with the information flowing back and forth in a feedback-type system via data stream 60, can be programmed to withhold commission payouts to group members who do not first meet certain prerequisite requirements. These prerequisites can be considered quotas. So rules of operation are important in the phased wave subset of the instant invention.

Product purchases can be required only upon entering the group for the first time with the commissions being paid out by computer 12 only after a certain number of sales are made. Thus the wave of re-entering back into the computer-controlled system keeps sales of product going and the relatively small group of people involved finds that each, in turn, makes their profit and then "re-ups" to continue the wave of purchases within the now tightly-knit group of people who now know each other very well. Thus this subset of the instant invention is no longer multi-level. It is instead serial commissions sales with a quota.

Rules can provide for bonus payments or prizes, etc. Computer 12 continues to track any and all bonuses, member movements into and out of any one group, the establishment of new, separate groups and sales and delivery of products.

Phasing the members into and out of various waves of different product sales moves goods in a small, closely-knit community while the product purveyors, earmarking parts of profits for distribution to the members themselves, is helping to increase the personal wealth of that closely-knit community's individual members. This is one process that can also have a bigger goal. In effect, it's a team that lets its individual members reach for their dreams and lets them be bigger than any one member could alone hope to be. The instant personal aspect helps instill self-esteem, discipline and structure in the members' lives. Each member can be a direct, living-flesh contact and an example to the others. They can each give the others support, share feelings and insights with the others. This highly personal aspect of the instant limited-number system can be crucial to the prevention of upline fizzle. Computer 12 in tying everything together makes for a stronger group.

The last novel process of the instant invention regards closing and safekeeping a network. This process could also be used to prop up, financially, the analogous system, shown in brackets, operating in the Spirit of the instant invention.

Classically, networks fizzle out when the people at the bottom cannot find other people to bring in to the network. They begin to lose funds and drop out. Their dropping out causes their "upline" to lose funds and the upline then fizzles out. This procedure produces a reverse chain reaction and the firm dies.

When the firm dies, obviously all the downline members lose. This is when charges are brought and the media gets involved. It is important to all concerned that this process be prevented.

The instant invention does prevent this upline fizzle. It does this by computerized means of safekeeping a network. See FIG. 2, branch completions b and c. The means essentially comprise providing for controlled payments to those newest members to join at the "bottom" levels of the pyramidal organization. Those people are the ones who might be called the "last" to get into the organization. This process allows them to break even (at minimum) and stay in the otherwise classical organization, thereby keeping the levels intact.

When the levels stay intact and those at the bottom are happy (because they are being provided with safekeeping payments) the firm NEVER dies. No one ever loses. The instant invention provides a concrete, completely novel, and thoroughly useful, result.

There are at least three processes by which payments to the bottom members may be provided. These processes are provided to potential nodes B as part of the rules and disseminated via the aforementioned storage means 9 of disks, CD-ROMs, etc. Storage devices 9 would be carrying or storing the rules for operation thereupon and thus, via dissemination of the storage media 9, would the detailed operating information be transferred from originator A to node B. This does not preclude the use of modems as the dissemination means. Naturally, appropriate storage means 9 at the receiving end of the modem (or other electronic) transmission would allow the node B to properly keep the data received pertaining to the operating system rules. In the first process the computer's internal processor would simply earmark a portion of node B profits for that purpose in a separate computer-tracked fund. In the second, the processor would allocate in the computerized bookkeeping the donation of products or services earmarked for those last members to join the organization. The third is to set up a special upline physical payment that always goes to the node B. For example, in a 3×3 setup where three separate payments are made by members to three upline members, there would be a fourth payment required (owed by the member as a prerequisite for joining the network) that is sent directly to the initiating node B. This extra payment can then be saved in an interest-bearing account until the computer's processor deems it is required for fulfilling safekeeping payments. These extra payments from each member can build up very quickly to a large total sum. These preferred methods comprise means for safekeeping a network so that it will not fall apart from the bottom up.

It shall be noted, however, that the process of safekeeping will work best in a larger organization. Firms (nodes B) just beginning would have little extra cash to use for safekeeping. Their time is better spent in increasing their membership levels. Safekeeping is more preferably for self-support and sustaining an organization than helping it build an organization. In other words, the rules for activating safekeeping carried on the storage means 9 provided to nodes B by the originator A, would be activated by a node B preferably only after it is up and running as a successful operation. It is not preferably meant for startup situations.

As seen above, first the example of a 3×3 organization and then one requiring members get four recruits is stated to be part of the overall rules. Choosing its organization makeup is one way in which an organization can customize its rules to best suit its needs while maintaining the overall rules intact. Other ways, such as customizing safekeeping are also seen in the following description. So it will be seen that the overall rules can be varied in many different ways by each organization without disregarding or ignoring the common rules put fourth by the establishing entity. Naturally, the basic rule of the nodes paying royalties or percentages to the establishing entity or making records available to it would never be compromised as that would then work to cause the establishing entity or originator to lose control over the network that it began.

Thus the basic structure and overall standards of the organization would be established via overall rules which then could be internally customized by each node B to better suit its detailed purpose. This would not break down the structure as the standards for one organization would not necessarily be the same as the standards for operating a completely differing organization. That is why they are different organizations to begin with. However, they are all the same in that they all want to use the overall standards of organization as put forth by the establishing entity originator A.

Safekeeping is also not part of the organization's charity. See FIG. 2, branch completion b. For example: a member is required to recruit four other members in order to "break even" on his monthly "dues" or "investment". He gets four. Three are excellent workers but one just can't do the job. The node B would NOT "safekeep" by paying the non-performing worker's dues. No firm can survive by supporting deadweight. The non-performer would be allowed to fall away as an unwanted drag or anchor on the organization. The node B would instead pay the missing dues of the deadweight's upline person who now has one missing worker under him in his personal organization. That would prevent him for falling away because he will not now be losing any funds due to having only three recruits instead of the required four. He was a proven performer. Therefore, he will probably perform again and thus make the payments back. The Safekeeping process then preferably becomes an incentive payout for organization performers. In all ongoing nodes B, the computer 12 would provide the processing means for calculating and verifying the member performance standards required by the rules and compare rules performance to those actually achieved by each individual member of the organization. It would also be the preferred means for calculating each member's level of breakeven funding and when that funding should be terminated. This information obviously comes from the continuing update inputs to the computer from the node B in reference to the standard weekly or monthly operations by each member. These inputs are part of the data stream 60, FIG. 8, flowing to the computer under human control and the processing and verifying results would then flow back to the nodes B also by the data stream 60. The member's input, orders, payments to the node B typically come by mail. When this mail is received, the node B's staff then updates preferably its own computer 12 with the latest information about the member's status by inputting the relevant data 60 to it, in any prior art manner, such as keyboards. And this can be done either directly or via modems, e-mail, etc. Prior art database and calculation methods and programs can be used in this calculating and verifying procedure. After this operation is finished, the computer 12 then calculates the required figures that should be paid out or not paid out to the various individual members. Naturally this specialized machine and process can be hired out as a service-for-hire.

Note that the organization would preferably pay the difference between a performer's breakeven monthly dues and the "overrides" he actually gets from his entire personal "downline" of recruited members. This process would preferably be performed only to the extent that it itself also breaks even. Thus: The commissions, overrides or dues on four personally recruited members provides monthly breakeven for any successful member. Two recruits fall away. The successful member is now losing on the dues he pays out (owes the node). The node B safekeeps the successful performer by paying his missing overrides on the two dropouts. The organization sees a net breakeven: 2 dues coming in, 2 dues paid out. It is not losing its funds and its proven performer is also not losing his funds. This protects the organization from unraveling. The performer will stay in as a member and will probably perform again, putting even greater funding into the organization.

As seen from the above, the organization must itself maintain a net breakeven in order to continue to exist. It does this by assuring that it first has funds available, does not overpay members, yet makes sure that deserving members get paid. Setting aside a breakeven fund, as described above, by requiring extra payments is only one way, as also is noting the downline success of a member. For other scenarios, such as letting members drop, see the following:

However in the above scenario, say two personal recruits fall away, but the remaining recruits have themselves produced a large well-performing, capital-generating downline. In this case, the computer 12 processor may easily find that though two recruits have dropped out, the payments being generated by the two remaining very successful downlines make up or more than make up for the missing two payments. Thus the computer processor calculating the safekeeping payments would end them even before they begin. And the node B would NOT have to make ANY safekeeping payments at all while fully retaining the capital-safety-retaining aspects of the instant invention.

Thus, it is seen that rules should accompany safekeeping. The rules should preferably come via computer-compatible storage medium 9 to the node B from the originator A—and, of course,—may be customized to suit the preferences of each individual node B. These customized rules should then be printed or written down for the information of the public and as a recruiting tool. Some typical rules are the following. If six recruits are required according to the originator A's plan to provide personal break-even on an individual's monthly dues; "donations"; product purchases; or payouts; the node B according to its own rules might pay to a maximum of three dropouts only. Or, it might immediately pay the missing dues on two recruits when a proven performer has first recruited four recruits. Obviously, concurrent rules might end those payments if the performing member suddenly gets "lazy" and does not recruit those two extra recruits within a certain, specified period of time. Thus, it encourages the recruit to keep working—or, it caps the growth. The node B's own written, chartered rules acted upon by computer processor 12 are the means by which these payments are determined and then issued. Issuance of payouts can be by means of node B check or simple bookkeeping entry to cancel the dues fragment owed by, or required of the performing member by the networking plan.

The computerized Safekeeping system is meant to prevent unraveling of an existing organization that cannot grow any more. Hence, rules that end "safekeeping" payments to an individual based upon knowledge that the levels around him grow deeper would not be out of line. That knowledge belies an individual's notion that he did not make money because he was the "last" to get in. In the instant organization, performers WILL be paid—even if there is nobody else in the area to sign up—NO ONE will lose for that reason. The instant invention takes the "lottery" completely out of multi-level marketing. No hard worker will ever lose funds no matter "where" he is in the organization. In the instant organization only performers make gains because they provide for the organization at least the minimum they owe for activation of breakeven, while lazy, non-workers do NOT gain a thing. If the last person in the whole nation is brought into the organization, that last person WILL break even so long as he wants to remain therein. That is the beauty of the instant novel safekeeping process. NO ONE who wants to work and produce what he owes the node B under contract will lose on his or her payouts to the node B. But the lazy, shiftless people who refuse to work or are too scared to properly work will lose and will drop out—and properly so. Maintenance of the levels means big donations to the organization. People who do not want big cash on hand or are scared of having a lot of funding personally available to them don't deserve it and should be dropped. But "maintenance" of the levels is crucial to the life of the organization. See FIG. 2, b reach completion C. It is also crucial to ending the "lottery" aspect or the sense of "gambling" on the life of a network marketing firm with one's hard work, time and efforts. And therefore, the instant computer-based, novel process of safekeeping the levels is crucial both to maintaining a multi-level firm alive and to the payments to all the firm's downline members. The process of safekeeping has never before appeared in the business community.

IN OPERATION, an originator A creatively devises a set of rules, bylaws and/or procedures for controlling, operating and safekeeping a network marketing structure. This may include a physical central location, means for storing records, warehouse(s), distribution means, labeling means and service providers which may also include providing fringe benefits. It preferably places these rules onto typical computer-compatible media 9 for dissemination to all its potential nodes B. They then would allow all nodes B to begin immediately to work the system without any or with only minimal delay. (This is provided, of course, that the individual nodes B would also have computers compatible with the storage media 9 so to read and thence act upon same.) The originator A then searches for groups who want to fundraise by using his organization. They may use all or only a part of it. They may use just the overall rules and nothing else. Each separate, individual group B will act totally independently of the originator A and any other initiating group B.

The groups B who agree to sign on with the originator A then make arrangements to receive his products, services, etc. as each separately and individually desires. And they arrange to provide payments (which can include passive royalties) to the originator A at its central location in return.

Each group B then individually adapts the overall originator A rules to best suit its own needs. This certainly should include the adoption of safekeeping rules and the means for carrying them out. These means for carrying them out would preferably be a computer 12 that is programmed to instantly calculate the breakeven funding via prior art type addition, subtraction multiplication and division. Thus, what safekeeping funding a preferably "performing" member is due, if any, by the node B upon updated input by the node B of the member's current status will be available to the node B in "real time". This is done by calculating the minimum performance standards required of members, i.e.: the minimum they owe the node B in order to qualify for or start the safekeeping profess; or, this information could be provided to the computer's processor as a stored value, i.e.: minimum number of members brought into the organization. Or a combination of the two. The computer 12 would also be programmed to calculate when a member does not initially qualify and also when a qualified member no longer qualifies for node help due to overall performance even better than previous. The computer's 12 internal processor would be programmed to verify member's performance as against required performance standards. It would verify that the member has met the requirements for breakeven; calculate how much is due the member so to produce breakeven for the member; and if it is actually needed by the member based on overall performance of the member coupled with the performance of the member's downline; and then, through node B staff updating input via data stream 60, verify that all members, having first met the minimum ruled performance standards—and been shown to be definitely owed funding—have received breakeven funding, i.e.: have been sent a check. The computer 12 could also generate the checks using a standard, prior-art accounting program and then call for issuing of same via output in data stream 60.

So when all is said and done, there exists a program originator A at a central location with agreements with multiple independent groups B at a multiple number of preferably different locations. Each group or node B initiates its own sales including and especially network-type sales under its own name while the originator A gets paid as a part of each node B's ongoing business. And each member of each node B's organization is guaranteed to break even on his or her investment, donations, dues or owed payments to the organization structure, by the computer 12 system processor directing the rules of safekeeping and processes for carrying out those rules.

In a corollary system; the computer 12 would control the actual number of members of any network of member/marketers. Thus specifically delimiting the number of members; it would then queue up those members for issuance of commission payments serially upon serial purchases by all the members in the delimited purchasing network. Acting upon rules stored upon media 9, via data stream 60, computer 12 would control a series of buying waves (which may be in multiple phases and selling multiple products, each product in turn in succeeding phase waves—or even multiple numbers of products in succeeding phase waves; including multiples of the same product) assuring that each time a member fully travels the wave of buying he is placed into a brand new starting position, thus automatically generating a succeeding wave. Each succeeding wave, or purchasing phase, will thus serially fund all members and continue rounds of purchasing far into the future.

The following claims are directed to a 'specific machine to produce a useful, concrete and tangible result'—namely a computer dedicated to the successful control, operation and life maintenance of the Multi-Node Networking type Marketing use as well as large-industrial-project fundraising use. They include claims for industrial use, controlling and manipulating data; and the novel; concrete result; and define use of a computer to achieve a result previously unknown in the field. There is a full integration of the new disclosed process or system and a computer.

The instant invention provides means for providing and controlling a novel organization structure and novel processes for operating and controlling the structure. Although a single preferred embodiment discloses a computerized system combining a multi-node structure with its crucial safekeeping process, other organizations may separate the two and/or devise similar plans that maintain the Spirit of the invention. The overall Spirit of the instant invention in its disclosed form and all other conceivable embodiments thereof are what I seek to protect via what

I claim:

1. A system under human control for safekeeping network marketing operations, comprising:

memory storage means for storing rules used for activating and operating said safekeeping;

processing means using said stored rules for activating and operating said safekeeping;

processing means using said stored rules for calculating an amount of breakeven funding for a downline member;

processing means for calculating a minimum set of prerequisite performance standards for said downline member in accordance with said stored rules;

processing means together with data input for verifying member performance standards against said minimum performance standards;

processing means for verifying if downline member has met breakeven funding via member's own performance;

said processing means for calculating said breakeven funding used for calculating said amount of breakeven funding owed to said performing downline member;

processing means for calculating and verifying said breakeven funding performance standards prerequisites said performing downline member owes;

means for paying said downline member said breakeven funding; and processing means for verifying that all downline members having met said performance standards prerequisites and due said breakeven funding have received said breakeven funding.

2. The system of claim 1 wherein said system further includes means for maintaining organization breakeven on said breakeven funding payouts to said downline members.

3. The system of claim 1 wherein said system further includes means for providing said human control with said stored rules and providing means for transferring said stored rules among differing organizations.

4. The system of claim 1 wherein said system further includes means for handling customizing changes to said stored rules among differing organizations operating under said stored rules.

5. The system of claim 1 wherein said processing means for calculating said amount of breakeven funding further includes means for adding the payouts resulting both from said downline member's own meeting of said member performance standards plus the additional payouts arising from the performance of said member's own downline before calculating if downline has met breakeven.

6. The system of claim 1 wherein said system further includes means for applying said rules only to members in the newest, bottommost levels of the organization.

7. The system of claim 1 wherein said system further includes means for stopping the growth of an organization in accordance with said rules when so desired.

8. The system of claim 1 wherein said processing means for calculating amount of breakeven funding includes means for verifying funding according to at least one of at least three different physical means for effectuating said funding.

9. The system of claim 1 wherein said processing means for verifying receipt of said breakeven funding includes means for ending said breakeven funding for said members under said rules.

10. A humanly controlled safekeeping system for enhancing a process for network marketing, comprising:

a computer;

said computer at least having means for inputting information about only the last members entering the network of said network marketing safekeeping system;

said computer having means for storing a set of minimum performance standards;

said computer having means for determining whether said last members meet said performance standards;

said computer having means for determining whether said last members have met breakeven; and said computer having establishing means for providing breakeven funding for said last members.

11. The system of claim 10 wherein said computer further includes means for directing payment via said human control; and means for ending said breakeven funding for said last members via a preset, stored set of determinations.

12. The system of claim 10 wherein said computer further includes calculating means for ensuring organization breakeven; and means for issuing funding for said establishing means for providing breakeven funding.

13. The system of claim 10 further comprising means for changing and adapting said standards internally by each of any individual entities using said system so to suit said entity's individual needs.

14. Computerized system to establish a network of entities having individual members under human control, for sustaining, and fundraising for multiple independent entities each having independent names and each doing independent types of business under a single establishing entity comprising:

means for establishing a centrally originating system to be networked under said single establishing entity;

centrally originating computer-compatible storage media in said centrally originating system;

standardized overall operating rules stored upon said originating storage media;

at least one computer including means for activating operations of multiple, individual and independent fundraising entities wishing to join said centrally originating system in said centrally originating system according to said stored rules;

means for transferring said rules in said originating storage media from said establishing entity to said multiple fundraising entities on demand;

means for said transfer of said rules stored on said storage media from said establishing entity to said multiple fundraising entities includes modems and other electronic transmission on demand;

means for individual, computer-compatible recordkeeping by each one of said multiple fundraising entities under said establishing entity's said rules;

means for duplicating said recordkeeping means on individual demand by each of said fundraising entities;

means for storing said original recordkeeping means;

separate means for storing said duplicated-on-demand recordkeeping means from said means for storing said original recordkeeping means;

at least one means for storing said duplicated-on-demand recordkeeping means for each one of said independent fundraising entities together with said establishing entity on demand according to said rules;

means for updating said duplicated-on-demand recordkeeping means;

means for providing payment to said individual members of said independent fundraising entities in accord with said rules;

means for providing payment to said individual members in accord with said rules by determining breakeven payments to last of said members entering into said centrally originating system;

means for said sustaining of said multiple independent fundraising entities;

means for said fundraising for said multiple independent fundraising entities; and means under said rules for providing payments by each of said fundraising entities to said establishing entity.

15. The system of claim 14 wherein said establishing entity does not itself have a core business; and said establishing entity itself does not have its own name but, instead, operates under the individual names of each one of said independent fundraising entities both serially and concurrently.

16. The system of claim 14 wherein each of said independent entities further includes means for individually and internally changing and adapting said rules carried upon said originating storage media so to suit said independent fundraising entities' individual needs.

17. The system of claim 14 wherein said establishing entity further includes means for providing product, help and support as needed to each separate one of each said independent fundraising entities.

18. The system of claim 14 wherein said system is a Multi-Node Network Marketing system.

19. The system of claim 18 wherein said system further includes means for safekeeping levels by providing means for maintaining said levels and all generated payments therewithin said system in the face of member drop outs of certain levels, said safekeeping means comprising:

processor means for determining financial breakeven of members of the bottom levels in said network; and processor means for issuing breakeven payments to said bottom level members to provide said breakeven thereto.

20. The system of claim 19 wherein said safekeeping means further includes processor means for determining when said breakeven payments are no longer needed; and verifying means for ending said breakeven payments when no longer needed.

21. The system of claim 14 wherein said system further includes means for safekeeping said system, said safekeeping means comprising:

processor means for accepting identification of last independent member entering thereinto said system;

processor means for generating instructions for selectively issuing breakeven payments to said last independent member; and processor means for generating instructions for ending said issuing of said breakeven payments.

22. The system of claim 14 wherein said computer further includes means in accordance with said stored rules for specifically delimiting the membership population of said independent fundraising entities.

23. The system of claim 14 wherein said means for activating said fundraising entities' operations further comprise means for effecting said independent members' placement into a wave queue phasing into at least one round robin series of product purchases.

24. The system of claim 14 wherein said means for activating said entities' operations includes activating operations as closed-loop, multiple, limited-member groups; and said computer further includes means for queuing and position-cycling with serial funding and phasing in a repeated manner; and means for providing feedback to all said fundraising entities involved.

25. The system of claim 14 wherein said computer further includes means for limiting the number of total members in any one organization and requiring continuing position-cycling of those same members.

* * * * *